(12) United States Patent
Aubain et al.

(10) Patent No.: US 6,417,799 B1
(45) Date of Patent: Jul. 9, 2002

(54) METHOD OF LOCATING AN INTERFERING TRANSMITTER FOR A SATELLITE TELECOMMUNICATIONS SYSTEM

(75) Inventors: Agnès Aubain, Toulouse; Bruno Lobert, Castanet; Francis Martinerie, Labarthe sur Leze; Bernard Deligny, Cugnaux, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/722,300

(22) Filed: Nov. 28, 2000

(30) Foreign Application Priority Data

Nov. 29, 1999 (FR) .............................. 99 14975

(51) Int. Cl.[7] .................................. H04B 7/19
(52) U.S. Cl. .................. 342/356; 342/352; 342/353; 342/16
(58) Field of Search .............................. 342/352, 353, 342/356, 357.01, 14, 15, 16

(56) References Cited

U.S. PATENT DOCUMENTS 5,008,679 A    4/1991  Effland et al.
5,570,096 A   10/1996  Knight et al.
5,687,196 A   11/1997  Proctor, Jr. et al.
5,955,987 A * 9/1999   Murphy et al. ........ 342/357.06

FOREIGN PATENT DOCUMENTS

WO    WO 97/11383    3/1997

* cited by examiner

Primary Examiner—Theodore M. Blum
(74) Attorney, Agent, or Firm—Sughrue Mion, PLLC

(57) ABSTRACT

The invention relates to a method of locating a jammer (14) of a satellite telecommunications system (10). To locate the jammer, at least two of the following three measurements are performed:

a measurement of the difference between the instant of arrival at the telecommunications satellite and at a detection satellite (16) of signals transmitted at the same time by the jammer (14), the detection satellite being used solely for detection purposes;

a measurement of the difference between the frequencies received by the telecommunications satellite and by the detection satellite, for a signal transmitted by the jammer; and an interferometric measurement of the angle between a direction associated with the detection satellite and the straight line between said satellite and the jammer (14).

13 Claims, 1 Drawing Sheet

METHOD OF LOCATING AN INTERFERING TRANSMITTER FOR A SATELLITE TELECOMMUNICATIONS SYSTEM

BACKGROUND OF THE INVENTION

The invention relates to a method of locating an interfering transmitter or "jammer" for a satellite telecommunications system.

Satellite telecommunications are particularly sensitive to interfering transmitters or jammers. When the interfering transmission reaches the satellite, it affects all of the communications covered by the earth satellite, which in general means coverage of a very large geographical extent. It is therefore particularly important for satellite telecommunications operators to be capable of detecting and locating interfering transmitters in order to take measures to have the jamming stopped. By way of example, such measures can be intervention with the local authorities from which the jammer depends so as to have them ensure that the undesired transmission ceases.

SUMMARY OF THE INVENTION

The invention provides particularly simple and effective means for detecting and locating interfering transmitters.

To locate jammers of a satellite telecommunications system, the invention makes use of a moving detection satellite, preferably in low or medium orbit, the satellite being dedicated solely to detection, and for location purposes, at least two of the three following measurements are performed:

a measurement of the difference between the instants of arrival at the telecommunications satellite and at the detection satellite of signals transmitted at the same time by the jammer, a measurement of the difference between the frequencies received by the telecommunications satellite and by the detection satellite, for a signal transmitted by the jammer; and an interferometric measurement of the angle between a direction associated with the detection satellite and the straight line between said satellite and the jammer.

The difference between the instants of arrival at the telecommunications satellite and at the detection satellite of signals transmitted at the same time by the jammer, can be used to deduce that the jammer lies on the surface of a hyperboloid whose foci are constituted by the two satellites (of known positions). The curve of intersection between the hyperboloid and the Earth can be calculated.

The measurement which consists in determining the difference between the frequencies received by the two satellites for a given jamming signal makes it possible to define an ellipsoid whose foci are the two satellites and on which the jammer is to be found. It is then possible to calculate the curve of intersection between said ellipsoid and the surface of the Earth. It is recalled at this point that because of the movements of the satellites and of the earth, the frequencies are offset by a Doppler effect which is proportional to the relative speed vector projected onto the satellite-jammer axis.

Thus, with two measurements it can be seen that the position of the jammer corresponds to a point of intersection between the curves of intersection between the Earth and the hyperboloid and the ellipsoid.

To lift ambiguities, it is also possible to repeat the first two measurements. Repeating the measurements at a different instant will necessarily give other curves of intersection since the detection satellite is a moving satellite.

To measure the difference between the arrival instants at the two satellites corresponding to transmission at the same instant by the jammer, and also to measure the difference between the received frequencies, conventional correlation methods are used.

The angle measurement defines a cone whose apex is constituted by the detection satellite and whose axis is said direction associated with the satellite. The jammer lies on the intersection between the cone and the earth.

Thus, in general, the position of the jammer is determined by the points of intersection between two curves of intersection, with the third being usable to lift ambiguities.

For a satellite telecommunications system, the invention provides adding a detection satellite which can be single and which can have a payload that is simple. In addition, the detection satellite can be used for locating the jammers interfering with a plurality of telecommunications satellites forming parts either of a single telecommunications system, or else of different systems. Thus, there is no need for each telecommunications operator to have its own detection satellite, since the satellite can be shared between a plurality of operators.

For measurements using the satellite of the telecommunications system, it is preferable to make use of the signals picked up by the ground station of the system. Under such conditions, the position-locating method does not require means to be installed on board the telecommunications satellite, and can thus be implemented even if no provision was made for such detection when the telecommunications system satellite was launched.

Thus, the invention provides a method of locating a jammer interfering with a satellite telecommunications system. To locate the jammer, at least two of the following three measurements are performed:

the difference is measured between the instants of arrival at the telecommunications satellite and at a satellite dedicated to detection of signals transmitted at the same time by the interfering transmitter;

the difference between the frequencies received by the telecommunications satellite and by the detection satellite is measured for a signal transmitted by the interfering transmitter; and the angle between a direction associated with the detection satellite and the straight line between said satellite and the interfering transmitter is measured interferometrically.

In an implementation, the telecommunications system includes a ground station and measurements involving the satellite of the telecommunications system are performed on the basis of signals picked up by the ground station.

In an implementation, a time reference is given to the ground station, e.g. a reference of the GPS type.

In an implementation, the position of the jammer is located in a ground station.

In an implementation, the telecommunications satellite is of the geostationary type or of the geosynchronous type.

In an implementation, the detection satellite is used to detect jammers interfering with a plurality of telecommunications systems.

In an implementation, the detection satellite is a moving satellite in low or medium orbit.

The present invention also provides a method of locating jammers that can interfere with a satellite telecommunications system. A moving satellite is provided that is dedicated solely to detection and that is suitable for covering the region covered by the telecommunications system, and at least two of the following three measurements are performed:

a measurement of the difference between the instants of arrival at the telecommunications satellite and at the detection satellite of signals transmitted at the same time by the jammer, a measurement of the difference between the frequencies received by the telecommunications satellite and by the detection satellite, for a signal transmitted by the jammer; and an interferometric measurement of the angle between a direction associated with the detection satellite and the straight line between said satellite and the jammer.

In an implementation, there is a single detection satellite.

In an implementation, the detection satellite is put into orbit after the satellite telecommunications system has been put into place.

BRIEF DESCRIPTION OF THE DRAWINGS

Other characteristics and advantages of the invention will appear from the following description of certain implementations, the description being given with reference to the accompanying drawing, in which.

DETAILED DESCRIPTION OF THE INVENTION

In the implementation of the invention described with reference to the figures, the underlying telecommunications system has calls relayed via a satellite 10 of the geostationary or geosynchronous type, i.e. a call sent by a terminal (not shown) is transmitted to the satellite 10 and means on board the satellite 10 retransmit the calls it receives to a ground station 12. Thereafter, the ground station forwards calls to other subscribers.

The problem to be solved is that of locating an interfering transmitter 14. For this purpose, a detection system is added to the telecommunications system, the detection system comprising a moving satellite 16 in low or medium orbit that, as a minimum, covers the zone that is covered by the satellite 10.

Since the function of the satellite 16 is that of detection only and since it does not intervene in the telecommunications system, its payload is small. In other words, the mass of the satellite 16 can be very small and its manufacturing and launch costs are therefore reduced.

Figure 1:
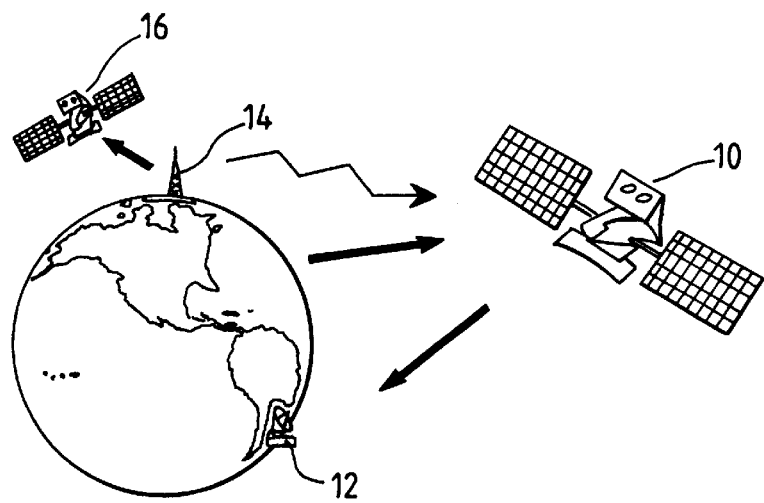
FIG. 1 is a diagram showing a terrestrial globe with a geostationary satellite of a telecommunications system and a detection satellite for the method of the invention.
Figure 2:
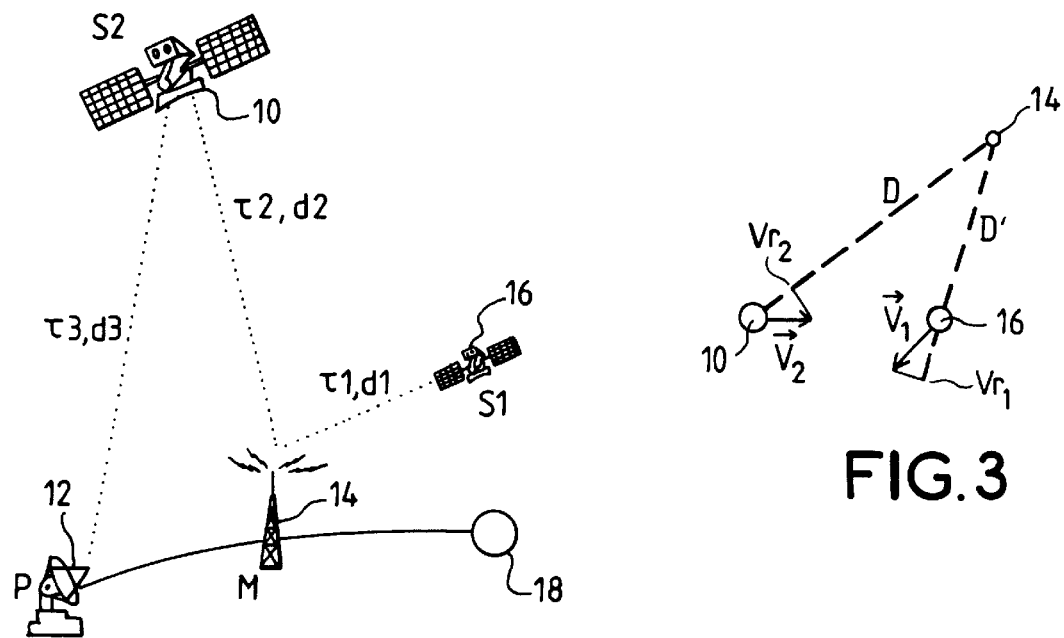
FIG. 2 is a diagram showing the calculation parameters used for the method of the invention.

The signals sent from the satellite 16 are received by at least one ground station 18 (FIG. 2) which is also in communication with the ground station 12 of the telecommunications system. It is in the station 18 that the received signals are processed in order to locate the interfering transmitter 14.

To locate the jammer 14, firstly the distance $MS_2-MS_1$ is measured where M is the point at which the jammer 14 is located, $S_2$ is the point in space where the satellite 10 is located at the time of the measurement, and $S_1$ is the point in space where the satellite 16 is located at the time of the measurement.

To this end, the difference $\tau_2-\tau_1$ is determined between the instants of arrival at the satellites $S_2$ and $S_1$ of signals that were transmitted at the same moment by the transmitter 14.

To measure the arrival instants of signals emitted at the same time, conventional correlation or cyclic correlation methods are used. A correlation method is described, for example, in the article entitled "Coherence and time delay estimation" by G. Clifford Carter, Proceedings of the IEEE, Vol. 75, No. 2, February 1987. A cyclic correlation method is described in the article entitled "Modified cyclic methods for signal selective TDOA estimation" by L. Izzo et al., IEEE Transactions on Signal Processing, Vol. 42, No. 11, November 1994.

To avoid using special measurement means on board the satellite 10 and/or to make it possible to use the detection method after the satellite 10 has been launched, use is made of the signals as received by the station 12.

Thus, to measure the distance $MS_2$, the distance $MS_2+S_2P$ is measured where $S_2P$ is the distance between the satellite 10 and the ground station 12. To obtain the distance $MS_2$, it thus suffices to subtract the distance $PS_2$ from the measurement performed at the station 12. This distance $PS_2$ is known since the position of the ground station 12 and the instantaneous position of the satellite 10 are both known. Given that the purpose of the ground station 12 is to receive signals transmitted by the satellite 10, there is no need to modify the equipment of the station 12. However, if the station does not have a time reference, it is necessary to provide means which generate such a time reference in the station. To this end, it is possible to use a global positioning system (GPS) receiver.

On the basis of the measured distance $MS_2-MS_1$, first data is deduced for locating the jammer 14. The point M (transmitter 14) lies on a hyperboloid whose foci are $S_2$ and $S_1$ (known positions) and this hyperboloid intersects the surface of the earth at a curve of intersection (not shown). Thus, measuring the difference of arrival times at the satellites 10 and 16 of the signal from the jammer 14 does not in itself suffice to locate the jammer. That is why use is made of a second measurement of the differential Doppler effect type.

Figure 3:
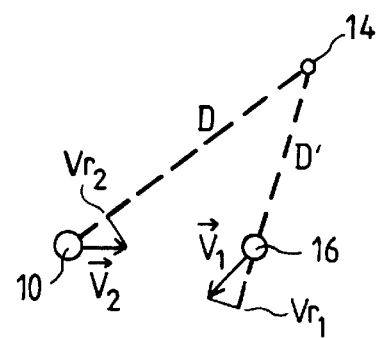
FIG. 3 is a diagram showing the principle of a measurement used in the method of the invention.

This measurement makes it possible to determine the components $V_{r1}$ and $V_{r2}$ of the speed vectors of the satellites relative to the transmitter 14 (FIG. 3). The component $V_{r1}$ lies on the straight line D' between the satellite 16 and the transmitter 14, and the component $V_{r2}$ lies on the straight line D between the satellite 10 and the transmitter 14 that is to be located.

These speed vector components are determined by frequency variations. As for measuring the difference between the travel time $\tau_1$ and $\tau_2$, the speed vector components must be measured using signals that were transmitted at the same instant by the jammer 14. For this purpose, a correlation method is used, as mentioned above.

Thus, for the satellite 16, the quantity $d_1$ is considered where:

$$d_1 = 1 - \frac{\vec{V_1}}{c \cdot S_1 M} \cdot \vec{S_1 M} \tag{1}$$

In this equation, c is the speed of light and $\vec{V_1}$ is the speed vector of the satellite 16.

For satellite 10, the quantity $d_2+d_3$ is considered, where:

$$d_2 + d_3 = 1 - \frac{\vec{V_2}}{c \cdot S_2 M} \cdot \vec{S_2 M} + 1 - \frac{\vec{V_2}}{c \cdot S_2 P} \cdot \vec{S_2 P} \tag{2}$$

To obtain $d_2-d_1$, it suffices to subtract $d_3$ from the difference $(d_2+d_3)-d_1$ where the quantity $d_3$ is known since the speed of the satellite 10 is known. The following is thus obtained:

$$d_2 - d_1 = \vec{\alpha} \cdot \vec{S_1 M} + \vec{\beta} \cdot \vec{S_2 M} \tag{3}$$

The points M satisfying this relationship lie on an ellipsoid having foci $S_1$ and $S_2$, and the curve of intersection between said ellipsoid and the surface of the earth is determined by calculation. Thus, the interfering transmitter 14 lies at a point of intersection between this curve of intersection and the previously determined curve of intersection.

Measuring frequency variation consists in measuring the difference between the carrier frequency of the jammer as received at station 12 ($d_2+d_3$) and the carrier frequency of the jammer as received by the satellite 16. If the frequency $f_0$ of the jammer is known, then this frequency difference measurement $\Delta f$ leads directly, from $\Delta d = \Delta f/f_0$ to the Doppler difference $\Delta d = (d_2+d_3)-d_1$. This situation arises when the satellite is geostationary: the Doppler effect received by the station 12 is then zero and the frequency received is the transmitted frequency $f_0$.

It is possible for the two curves of intersection themselves to intersect at a plurality of points. To lift any ambiguity or when the frequency of the jammer is not known (for example if the satellite 10 is geosynchronous), it is possible either to perform at least one second measurement at a different instant, or else to perform an additional measurement of the interferometric type. This measurement consists in determining the angle between a direction associated with the satellite 16 and the direction D' connecting the satellite 16 to the transmitter 14. Such interferometric means are conventional. They require at least two antennas on board the satellite 16, said antennas being spaced apart by a distance that depends on the operating frequency band.

Thus, with this measurement, a cone is defined whose axis is the direction associated with the satellite 16 and whose apex is at the satellite. This cone likewise presents a curve of intersection with the Earth which can be used to lift ambiguity.

If the frequency of the jammer is not known, then it must be estimated. Or at least an additional Doppler measurement is necessary since under such circumstances there is an additional unknown which gives rise to the need for an additional equation. The unknowns are then the position of the jammer and its frequency, and the measurements consist in:

at least one measurement of the difference between arrival times, and at least two measurements of frequency difference; or at least one measurement of arrival time difference and an angle measurement; or at least one measurement of each type.

In general, to determine the position of the jammer 14, two or three of the above-described measurements are performed, namely: a measurement between the travel time differences of signals transmitted at the same instant by the transmitter 14 towards the two satellites; a Doppler effect measurement; and an interferometric measurement. To lift ambiguities that may result from two such measurements, either the third type of measurement is performed, or else a second series of measurements is performed at different instants for the same two types of measurement as performed in the first place.

It should be observed that the satellite 16 can be associated with a plurality of telecommunications systems having relay satellites, and possibly operating at different frequencies or over different geographical zones.

What is claimed is:

1. A method of locating a jammer (14) of a satellite telecommunications system (10), the method being characterized in that for location purposes, at least two of the following three measurements are performed:

a measurement of the difference between the instant of arrival at the telecommunications satellite and at a detection satellite (16) of signals transmitted at the same time by the jammer (14), the detection satellite being used solely for detection purposes;

a measurement of the difference between the frequencies received by the telecommunications satellite and by the detection satellite, for a signal transmitted by the jammer; and an interferometric measurement of the angle between a direction associated with the detection satellite and the straight line between said satellite and the jammer (14).

2. A method according to claim 1, characterized in that the telecommunications system includes a ground station (12) and in that measurements involving the satellite of the telecommunications system are performed on the basis of signals picked up by the ground station (12).

3. A method according to claim 2, characterized in that the ground station includes a global positioning system time reference.

4. A method according to claim 1, characterized in that the position of the jammer is located in a ground station (18).

5. A method according to claim 1, characterized in that the telecommunications satellite (10) is of the geostationary type or of the geosynchronous type.

6. A method according to claim 1, characterized in that the detection satellite (16) is used to detect jammers (14) interfering with a plurality of telecommunications systems.

7. A method according to claim 1, characterized in that the detection satellite is a moving satellite in low or medium orbit.

8. The method of claim 1, wherein three measurements are performed including measurement of the time difference, measurement of the difference between the frequencies, and the interferometric measurement.

9. The method of claim 3, wherein the measurement of the time difference includes adding components of transmission from said telecommunications satellite to said ground station and from said jammer to said telecommunications satellite and subtracting a time component contributed by the transmission from said telecommunications satellite to said ground station.

10. A method for locating jammers disturbing a satellite telecommunications system, the method being characterized in that a moving detection satellite is provided, said satellite being used solely for detection purposes, and operably covering the region that is covered by the telecommunications system, and in that at least two of the following three measurements are performed:

a) a measurement of the difference between the instants of arrival at the telecommunications satellite and at the detection satellite of signals transmitted at the same time by the jammer, b) a measurement of the difference between the frequencies received by the telecommunications satellite and by the detection satellite, for a signal transmitted by the jammer; and c) an interferometric measurement of the angle between a direction associated with the detection satellite and the straight line between said satellite and the jammer.

11. A method according to claim 10, characterized in that there is a single detection satellite.

12. A method according to claim 10, characterized in that the detection satellite is put into orbit after the satellite telecommunications system has been put into place.

13. The method of claim 10, wherein measurement of a)–c) are performed.

* * * * *